UNITED STATES PATENT OFFICE.

JOHANN BAMMANN AND ERNST DAVIDIS, OF ELBERFELD, GERMANY, ASSIGNORS TO THE FARBENFABRIKEN OF ELBERFELD COMPANY, OF NEW YORK, N. Y.

BLUE TETRAZO DYE AND PROCESS OF MAKING SAME.

SPECIFICATION forming part of Letters Patent No. 656,619, dated August 28, 1900.

Application filed December 4, 1899. Serial No. 739,151. (Specimens.)

*To all whom it may concern:*

Be it known that we, JOHANN BAMMANN and ERNST DAVIDIS, doctors of philosophy, chemists, (assignors to the FARBENFABRIKEN OF ELBERFELD COMPANY, of New York,) residing at Elberfeld, Germany, have invented a new and useful Improvement in Tetrazo Dyes; and we hereby declare the following to be a clear and exact description of our invention.

Our invention relates to the production of a new class of tetrazo dyestuffs by combining one molecule of a tetrazotized paradiamin of the benzidin series (such as benziden, tolidin, dianisiden) with one molecule of an alpha-naphthol disulfonic acid and coupling the intermediate products thus obtained with one molecule of 2.7-amidonaphthol. The dyestuffs thus obtained are alkaline salts of acids having the general formula

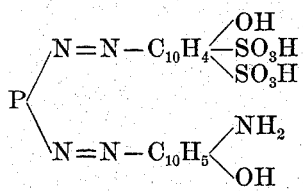

in which formula P means a radical of the benzidin series, such as diphenyl, ditolyl, diphenolether, or the like. The new coloring-matters represent dark powders soluble in water with a color varying from reddish-violet to blue. They yield on unmordanted cotton bright shades from reddish-violet to blue and can be rediazotized on the fiber and coupled with a suitable component.

In carrying out our invention practically we can proceed as follows, (the parts being by weight:) 24.4 kilos of dianisidin are tetrazotized in the usual way. The so-obtained solution of the tetrazo compound is exactly neutralized with sodium carbonate and then mixed with thirty-five kilos of the disodium salt of 1-naphthol 3-6-disulfonic acid with continuous stirring. After the addition of 10.6 kilos of sodium carbonate the stirring is continued for three hours until the formation of the intermediate product is completed. Subsequently a solution prepared from 8 kilos of sodium hydroxid, one hundred kilos of water, and 16.5 kilos of 2.7-amidonaphthol is run into the reaction mixture while energetically stirring. After having further stirred for twelve hours the mass is heated to about 80° centigrade, and the dyestuff thus produced is precipitated with common salt, filtered off, dried, and pulverized. It is the sodium salt of an acid having the formula

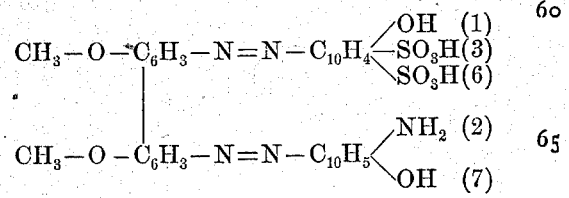

and represents a dark-bronzy colored powder easily soluble in water with a bluish-violet color, soluble in concentrated sulfuric acid with a greenish-blue color, which turns into deep blue on adding a small quantity of ice, while a bluish-violet precipitate is obtained on the addition of a larger quantity of ice to the sulfuric acid solution. It is also soluble in alcohol with a violet color, readily soluble in ammonia with a bluish-violet color.

The coloring-matter dyes unmordanted cotton bright and fast blue shades. When the dyestuff is rediazotized on the fiber and further coupled with beta-naphthol, bright reddish-blue shades are obtained, which are distinguished by their fastness against washing.

Having now described our invention and in what manner the same is to be performed, what we claim as new, and desire to secure by Letters Patent, is—

1. The process for producing new tetrazo dyestuffs by first combining one molecule of a tetrazotized paradiamin with one molecule of an alpha-naphthol disulfonic acid, secondly coupling the resulting intermediate product with one molecule of 2.7-amidonaphthol and finally isolating the dyestuffs thus produced, substantially as hereinbefore described.

2. The process for producing a new tetrazo dyestuff by first combining one molecule of tetrazotized dianisidin with one molecule of 1-naphthol 3.6-disulfonic acid, secondly coupling the intermediate product thus obtained with one molecule of 2.7-amidonaphthol and finally isolating the resulting dyestuff, substantially as described.

3. As new articles of manufacture the new tetrazo dyestuffs being alkaline salts of acids having the general formula:

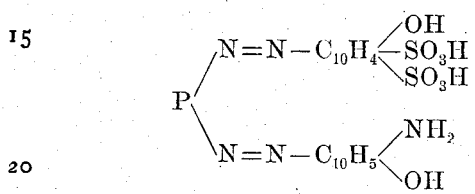

in which formula P means a radical of the benzidin series, which dyestuffs are dark powders, soluble in water with a color varying from reddish-violet to blue, rediazotizable on the fiber, dyeing unmordanted cotton bright from reddish-violet to blue shades, substantially as described.

4. As a new article of manufacture the specific dyestuff being an alkaline salt of the acid having the formula:

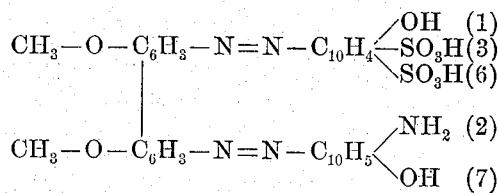

which is a dark bronzy-colored powder, easily soluble in water with a bluish-violet color soluble in concentrated sulfuric acid with a greenish-blue color which turns into deep blue on adding a small quantity of ice while a bluish-violet precipitate is obtained on the addition of a larger quantity of ice to the sulfuric acid solution, soluble in alcohol with a violet color, in ammonia with a bluish-violet color, dyeing unmordanted cotton blue shades, yielding reddish-blue shades fast to washing when rediazotized on the fiber and further coupled with beta-naphthol, substantially as hereinbefore described.

In testimony whereof we have signed our names in the presence of two subscribing witnesses.

JOHANN BAMMANN.
ERNST DAVIDIS.

Witnesses:
 OTTO KÖNIG,
 J. A. RITTERSHAUS.